(12) United States Patent
Li et al.

(10) Patent No.: US 10,634,697 B2
(45) Date of Patent: Apr. 28, 2020

(54) HIGH-SENSITIVITY SENSOR SYSTEM, DETECTION CIRCUIT, AND DETECTION METHOD

(71) Applicant: HITACHI, LTD., Chiyoda-ku, Tokyo (JP)

(72) Inventors: Wen Li, Tokyo (JP); Hisaaki Kanai, Tokyo (JP); Takashi Ooshima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 15/519,597

(22) PCT Filed: Apr. 8, 2015

(86) PCT No.: PCT/JP2015/061033
§ 371 (c)(1),
(2) Date: Apr. 17, 2017

(87) PCT Pub. No.: WO2016/162986
PCT Pub. Date: Oct. 13, 2016

(65) Prior Publication Data
US 2017/0254831 A1    Sep. 7, 2017

(51) Int. Cl.
*G01P 21/00* (2006.01)
*G01V 1/18* (2006.01)
(Continued)

(52) U.S. Cl.
CPC .............. *G01P 21/00* (2013.01); *G01H 11/06* (2013.01); *G01P 15/0802* (2013.01);
(Continued)

(58) Field of Classification Search
CPC .... G01P 21/00; G01P 15/0802; G01P 15/125; G01V 1/164; G01V 1/18; G01H 11/06
See application file for complete search history.

(56) References Cited

U.S. PATENT DOCUMENTS

5,852,242 A * 12/1998 Devolk .................. G01P 1/006
73/514.17
6,497,149 B1 * 12/2002 Moreau ................. G01P 15/125
73/514.32
(Continued)

*Primary Examiner* — Randy W Gibson
*Assistant Examiner* — Gedeon M Kidanu
(74) *Attorney, Agent, or Firm* — Miles & Stockbridge, P.C.

(57) ABSTRACT

It is an object of the present invention to reduce noise in a detection circuit for use in a sensor system.
According to an aspect of the present invention, provided is a high-sensitivity sensor system which includes an acceleration sensor, a detection circuit system that detects an output of the acceleration sensor, a feedback circuit system including a reference voltage power source that generates a feedback signal to be fed back to the acceleration sensor based on an output of the detection circuit system, and a correction circuit system. The correction circuit system includes a reference power source variation detection circuit that detects a variation component from a reference voltage of the reference voltage power source, an output signal error calculation circuit that receives an output of the reference power source variation detection circuit as an input, and calculates a change in the variation component up to the output of detection circuit system via the acceleration sensor, and an operation circuit that subtracts an output of the output signal error calculation circuit from the output of the detection circuit system.

16 Claims, 8 Drawing Sheets

(51) Int. Cl.
*G01V 1/16* (2006.01)
*G01H 11/06* (2006.01)
*G01P 15/08* (2006.01)
*G01P 15/125* (2006.01)

(52) U.S. Cl.
CPC ............ *G01P 15/125* (2013.01); *G01V 1/164* (2013.01); *G01V 1/18* (2013.01)

(56) References Cited

U.S. PATENT DOCUMENTS

| | | | | |
|---|---|---|---|---|
| 2007/0199373 | A1* | 8/2007 | Sato | G01P 21/00 73/114.07 |
| 2012/0163498 | A1* | 6/2012 | Ashita | H03F 1/3247 375/297 |
| 2014/0318244 | A1* | 10/2014 | Tsutsumi | G01C 19/5776 73/504.12 |

* cited by examiner

HIGH-SENSITIVITY SENSOR SYSTEM, DETECTION CIRCUIT, AND DETECTION METHOD

TECHNICAL FIELD

The present invention relates to a signal detection technique, and more particularly, to a technique of exploring for resources such as petroleum oil or gas using a vibration sensor.

BACKGROUND ART

A technique of exploring for resources such as petroleum oil, gas, or a mineral vein using a vibration sensor is known. In this technique, a plurality of vibration sensors are provided, and the presence or absence or a position of resources is specified such that a vibrational wave is generated by a vibration exciter or blasting, and a vibrational wave reflected against resources such as petroleum oil buried underground is detected by the vibration sensors.

For example, a micro electro mechanical systems (MEMS) sensor which is an acceleration sensor is used as the vibration sensor. Since resources are buried deep in the group, and there is a restriction to energy of the vibrational wave generated by the vibration exciter or the like, it is necessary to increase sensitivity of the sensor in order to perform the exploration with a high degree of accuracy.

As a document stating a sensor detection circuit according to a related art, there are Patent Document 1 (U.S. Pat. No. 6,497,149) and Patent Document 2 (U.S. Pat. No. 5,852,242).

CITATION LIST

Patent Document

Patent Document 1: U.S. Pat. No. 6,497,149
Patent Document 2: U.S. Pat. No. 5,852,242

SUMMARY OF THE INVENTION

Problems to be Solved by the Invention

For example, an MEMS sensor which is an acceleration sensor is used as the vibration sensor. Since resources are buried deep in the group, and there is a restriction to energy of the vibrational wave generated by the vibration exciter or the like, a signal that can be detected by the MEMS is weak. Thus, in order to perform the exploration with a high degree of accuracy, it is necessary to increase the sensitivity of the detection circuit. At this time, it is also necessary to consider noise of a circuit that detects an output of the sensor. Further, when it is desired to perform a wide range resource exploration, it is necessary to arrange a number of sensors, and it is also an important problem to reduce power consumption.

The present invention has been made through review of a detection circuit used in an MEMS sensor system that is suitable for a resource exploration system and has ultrahigh sensitivity and low power consumption.

Figure 1:
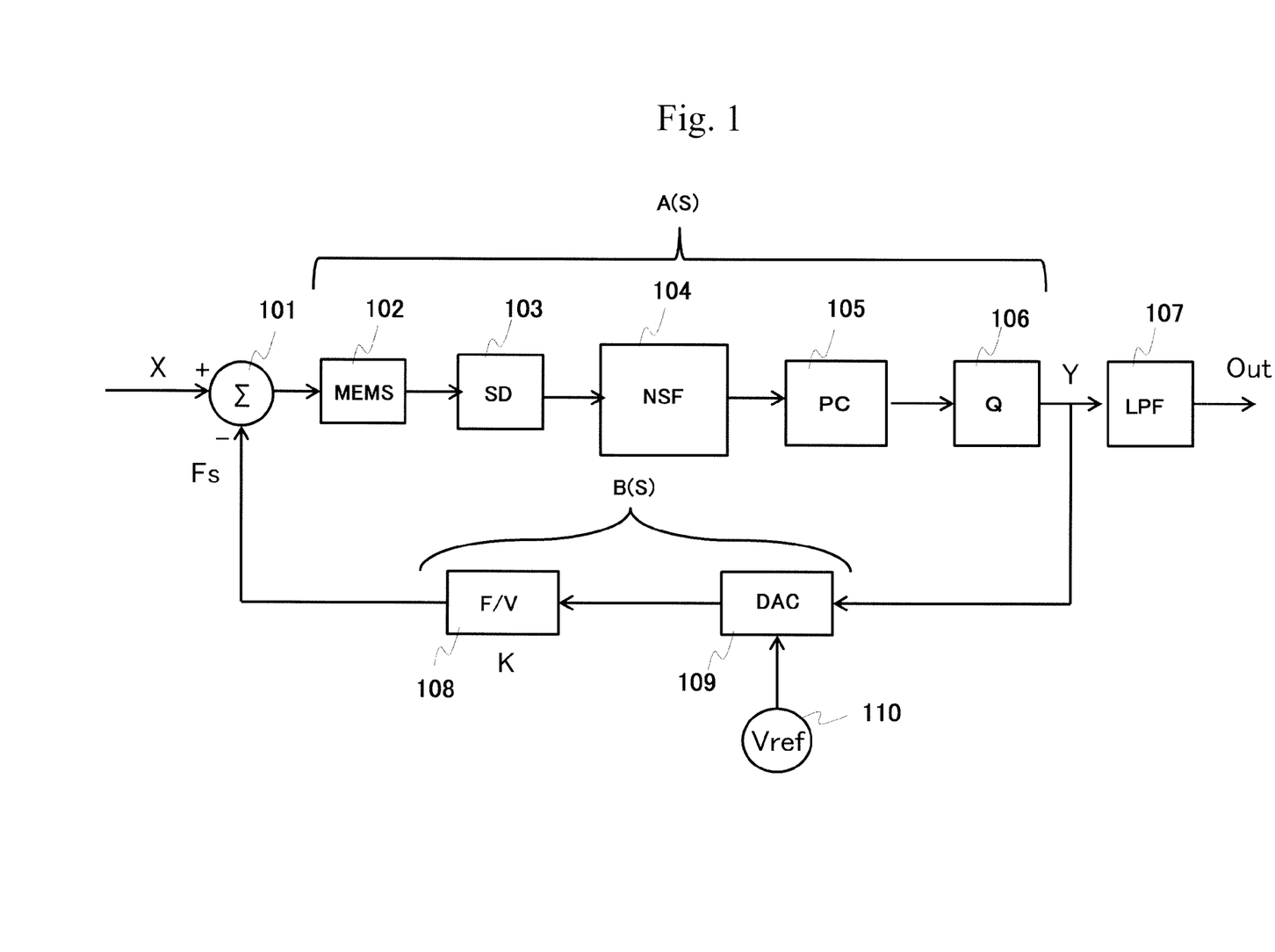
FIG. 1 is a block diagram illustrating a configuration according to a comparative example.

A problem to be solved by the invention will be specifically described with reference to FIG. 1. FIG. 1 illustrates an example of a MEMS sensor system configured with a servo-control system using a delta sigma circuit scheme which is created by the inventors to describe the assumption of the present invention. The servo-control system using the delta sigma circuit scheme is known and also disclosed in Patent Document 1.

In this system, an MEMS sensor 102 detects a signal wave X reflected from an exploration object (for example, petroleum oil resources). The MEMS sensor detects a physical signal wave as a change in capacitance. To this end, the MEMS includes, for example, a fixed electrode and a movable electrode that moves relatively to the fixed electrode due to an action of acceleration and causes a change in capacitance of a capacitor which are installed therein. A signal detection circuit 103 generates a detection signal by converting a signal indicating the change in the capacitance output from the MEMS sensor 102 into a voltage.

The noise shaping filter 104 performs waveform shaping on the detection signal. As well known, in the delta sigma circuit scheme, when an analog signal is converted into a digital code, a power spectrum density distribution of sampled quantization noise is shaped at a high speed, and thus a dynamic range of a pass band is improved. According to the delta sigma circuit scheme, encoding can be performed using a smaller quantization word length number. The noise shaping filter 104 is a circuit that shapes an input to shape quantized quantization noise.

A phase corrector 105 performs phase correction on the analog signal that has passed the noise shaping filter 104 according to a relative position between a vibration source and the sensor as necessary. Thereafter, the analog signal is converted into a digital signal by a one-bit quantizer 106. A digital signal Y passes through a low pass filter 107 and detected as an output signal OUT. In the resource exploration, a signal meaningful to the exploration is a low frequency region. A(S) and B(S) are transfer functions in an illustrated range.

Figure 2:
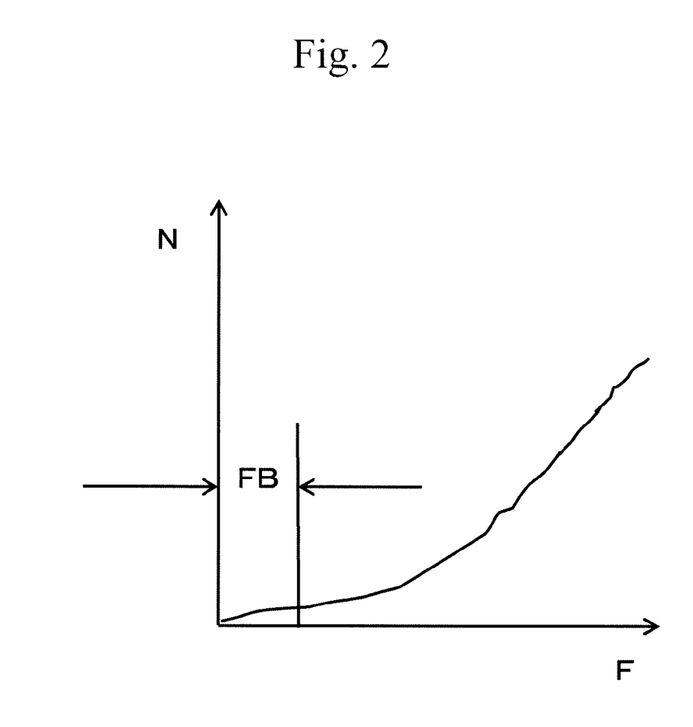
FIG. 2 is a graph illustrating an operation according to the comparative example.

FIG. 2 illustrates a relation between a pass characteristic and a noise component of the low pass filter 107 of FIG. 1. A horizontal axis indicates a frequency, and a vertical axis indicates a noise level (an arbitrary unit). A low frequency region FB is a frequency region that is desired to be detected, for example, a band of 1 kHz or less. In the present embodiment, a region of about several hundreds of hertz (Hz) is set. It is understood that a noise component is included in the low frequency region FB.

Generally, in order perform high-sensitivity detection, it is necessary to increase a Q value, but since it easily resonates, it is necessary to stabilize it through feedback. For this reason, the output of the one-bit quantizer 106 is fed back, converted into an analog voltage signal through a one-bit digital-analog conversion circuit 109 that receives a reference voltage Vref generated by a servo-control voltage source 110, converted into a force signal Fs by a conversion circuit 108, and subtracted from the signal wave X (the force signal) by a synthesizer 101. In other words, a circuit configuration that performs stabilization through feedback control is provided.

As a method of reducing the force signal, for example, it is desirable to correct electrode intervals of the MEMS 102 using electric charges according to the signal Fs as disclosed in Patent Document 1.

In this circuit configuration, a condition under which the system becomes stable is a condition indicated by Formula 1.

$$Y \approx X/B$$

$$B = V\text{ref} \times K$$

$$X\text{meas} \approx Y \times K \times V\text{ref} = X \qquad \text{[Formula 1]}$$

Here,

Y: Output signal of quantizer
X: True value of input signal
Vref: Servo-control reference voltage
K: Constant set by conversion circuit
Xmeas: Measured input signal A low frequency noise of a reference voltage that is dealt with in the present invention will be described with reference to FIG. 3.

Figure 3:
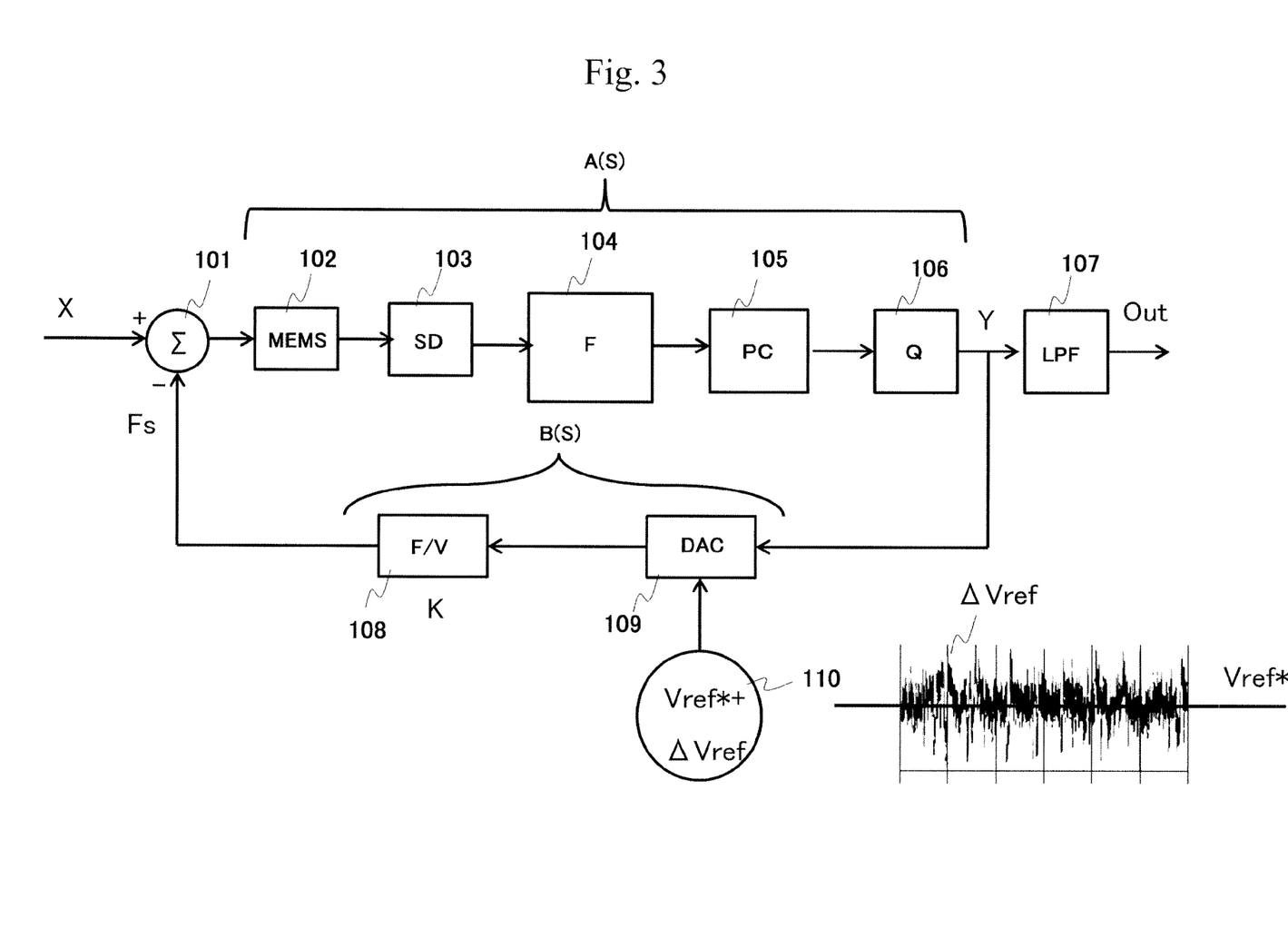
FIG. 3 is a block diagram for describing a problem of the present invention.

A DC voltage of about 10 V is necessary as a servo-control reference voltage Vref used in the one-bit digital-analog conversion circuit 109. However, a low frequency noise (1/f noise) ΔVref is commonly included in the servo-control reference voltage Vref obtained by the DC voltage. FIG. 3 illustrates an example of a ΔVref waveform with respect to an ideal reference voltage Vref*. Thus, the servo-control reference voltage Vref can be indicated by the following Formula:

$$Vref = Vref^* + \Delta Vref$$

Vref*: Ideal servo-control reference voltage
ΔVref: Low frequency noise component ΔVref is, for example, several tens to several hundred of nV.

Thus, when the low frequency noise component is considered, Xmeas that is actually measured is indicated as in Formula 2.

$$Y \approx X/B$$

$$B = (Vref^* + \Delta Vref) \times K$$

$$Xmeas \approx Y \times K \times (Vref^* + \Delta Vref) = X + Y \times K \times \Delta Vref \quad \text{[Formula 2]}$$

In other words, Xmeas that is measured is indicated by $$Y^* K^* \Delta Vref, \text{ and}$$

includes a measurement error that is caused by a frequency noise of a voltage source. However, it is difficult to perfectly remove the low frequency noise component from the servo-control voltage source 110.

Figure 4:
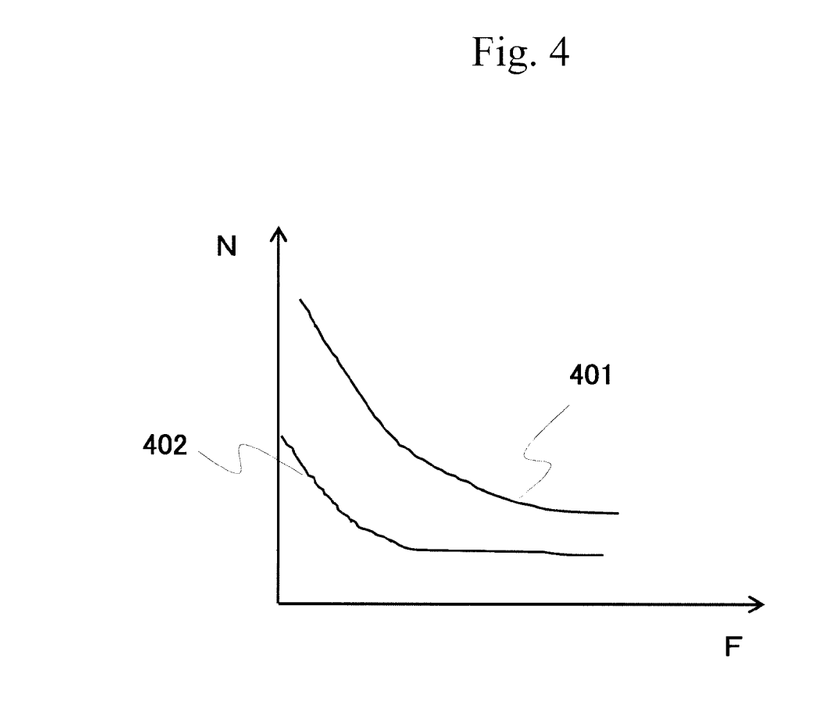
FIG. 4 is a graph illustrating a voltage variation (noise) level of a high-accuracy reference power source.

FIG. 4 illustrates an enlarged view illustrating the low frequency region portion (FB) of FIG. 2. A horizontal axis is a frequency, and a vertical axis indicates a noise component (an arbitrary unit). There is a technique of increasing a bias current in order to reduce noise. FIG. 4 illustrates an example of a noise level 401 when the bias current is small (for example, 0.5 mA) and a noise level 402 when the bias current is large (for example, 4 mA). As can be seen from FIG. 4, even when the low frequency noise is reduced to a certain level, it is necessary to significantly increase the bias current. In this case, it is difficult to perform a predetermined degree of noise reduction or more. In order to increase the bias current, it is necessary to increase the circuit size. For this reason, it is necessary to use an expensive voltage source, and power consumption is also increased. The cost and the power consumption become a big problem when a plurality of sensors are arranged on a large area two dimensionally or three dimensionally.

In the techniques disclosed in Patent Documents 1 and 2, such a problem is not considered.

(Object of Present Invention)

It is an object of the present invention to reduce noise in a detection circuit for use in a sensor system. Other problems, configurations, and effects that are not mentioned above will be apparent from a description of an embodiment to be described below.

Solutions to Problems

In order to achieve the above object, according to an aspect of the present invention, provided is a high-sensitivity sensor system which includes an acceleration sensor, a detection circuit system that detects an output of the acceleration sensor, a feedback circuit system including a reference voltage power source that generates a feedback signal to be fed back to the acceleration sensor based on an output of the detection circuit system, and a correction circuit system. The correction circuit system includes a reference power source variation detection circuit that detects a variation component from a reference voltage of the reference voltage power source, an output signal error calculation circuit that receives an output of the reference power source variation detection circuit as an input, and calculates a change in the variation component up to the output of detection circuit system via the acceleration sensor, and an operation circuit that subtracts an output of the output signal error calculation circuit from the output of the detection circuit system.

In order to achieve the above object, according to an aspect of the present invention, provided is a detection circuit which includes a detection circuit system that detects a signal output from an acceleration sensor, a feedback circuit system including a reference voltage power source that generates a feedback signal to be fed back to the acceleration sensor based on an output of the detection circuit system, and a correction circuit system. The correction circuit system includes a reference power source variation detection circuit that detects a variation component from a reference voltage of the reference voltage power source, an output signal error calculation circuit that receives an output of the reference power source variation detection circuit as an input, and calculates a change in the variation component up to the output of detection circuit system via the acceleration sensor, and an operation circuit that subtracts an output of the output signal error calculation circuit from the output of the detection circuit system.

In order to achieve the above object, according to an aspect of the present invention, provided is a detection method which a detection process of electrically detecting an output of an acceleration sensor, a feedback process of generating a feedback signal to be fed back to the acceleration sensor based on a detection signal detected in the detection process using a reference voltage, and a correction process. The correction process includes a reference power source variation detection process of detecting a variation component from the reference voltage, an output signal error calculation process of calculating a change which the variation component applies to the detection signal, and an operation process of subtracting the change from the detection signal detected in the detection process.

As a specific example, a micro electro mechanical systems (MEMS) device may be used as an example of the acceleration sensor. Further, the delta sigma circuit scheme may be applied to a detection and feedback configuration. A 1-bit or multi-bit configuration may be applied to quantization in the delta sigma circuit scheme.

Further, the present invention includes a method of preparing a plurality of high-sensitivity sensor systems or circuits for performing a high-sensitivity detection method and performing an underground resource exploration in a wide range.

MODE FOR CARRYING OUT THE INVENTION

Hereinafter, exemplary embodiments will be described with reference to the appended drawings. However, the present invention is not interpreted to be limited to a description of the following embodiments. It should be understood by those having skill in the art that a specific configuration of the present invention can be changed within the scope not departing from the spirit and gist of the present invention.

In a configuration of the invention to be described below, the same parts or parts having similar functions are denoted by the same reference numerals in different drawings, and a repeated description may be omitted.

In the present disclosure, notation such as "first," "second," and "third" is added to identify constituent elements and not intended to limit a number or an order necessarily. Numbers identifying constituent elements are used for each context, and a number used in one context does not necessarily indicate the same element in another context. A constituent element identified by a certain number is not forbidden to work as same function as that of a constituent element identified by another number.

For example, a position, a size, a shape, or a range of each of components illustrated in the drawings may not be an actual position, an actual size, an actual shape, or an actual range thereof for facilitation of understanding the invention. Thus, the present invention is not necessarily limited to, for example, a position, a size, a shape, or a range illustrated in the drawings.

Hereinafter, an example of improving signal detection sensitivity of an acceleration sensor by correcting a detection signal error caused by a reference power source voltage variation will be described.

First Embodiment

Figure 5:
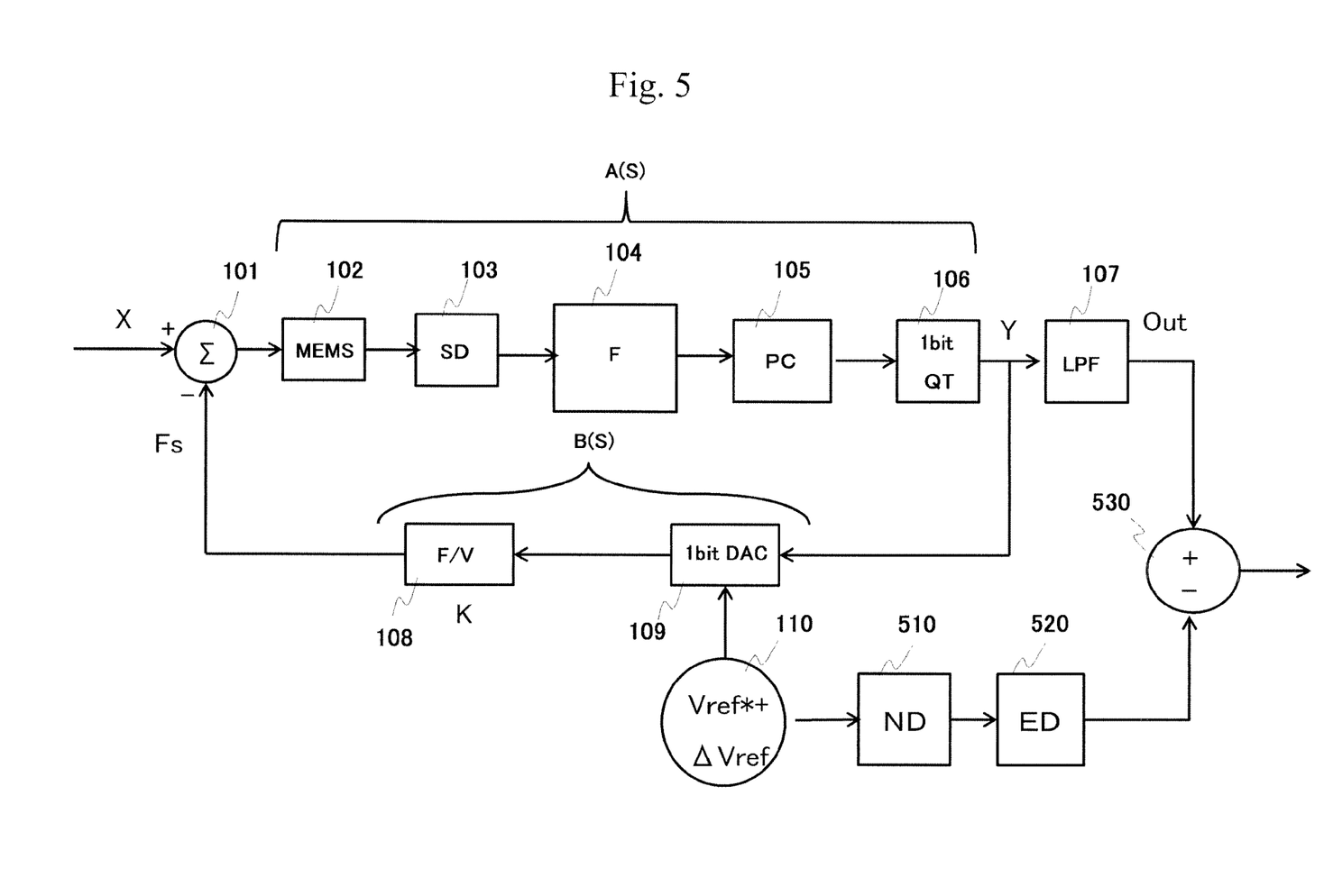
FIG. 5 is a block diagram for describing a first embodiment of the present invention.

FIG. 5 is a block diagram for describing an embodiment of the present invention. The same components to those in FIG. 1 are denoted by the same reference numerals. In this embodiment, a low frequency voltage variation ΔVref of a reference voltage Vref from a servo-control voltage source 110 is detected through another path, an error of an output caused by a voltage variation is calculated, and the error is cancelled from an output signal Y.

As illustrated in FIG. 5, in the output of the servo-control voltage source 110, the variation (low frequency noise) ΔVref from an ideal value Vref* is detected through a reference power source variation detection circuit 510. The reference power source variation detection circuit 510 is known to modulate an input signal to a high frequency, perform demodulation to an original frequency after the detection, and extract the noise component through a filter or the like. As such a detection circuit, a 1/f noise detection circuit which is known or provided in the market may be applied.

The detected low frequency noise component is input to an output signal error calculation circuit 520, and an output signal error included in the output Y is calculated. The output signal error calculation circuit 520 is a sort of simulator and simulates a circuit characteristic from the one-bit digital-analog conversion circuit 109 to the one-bit quantizer 106. In a simulation model, it is desirable to perform modeling by a known circuit theory based on a circuit design value and an operation using a microcomputer or the like. As a specific example, it is desirable to perform modeling through the transfer function A(s) of the detection circuit system and the transfer function B(s) of the feedback circuit system illustrated in FIG. 5.

Through the above configuration, the output of the output signal error calculation circuit 520 indicates an error component that is caused by the low frequency noise ΔVref and included in the output Y. A term of Y×K×ΔVref in Formula 2 is the error component. Thus, by subtracting the output of the output signal error calculation circuit 520 from the output of the low pass filter 107 through an operation circuit 530, it is possible to cancel influence of the low frequency noise ΔVref on the output signal Y and obtain a value in which the input X is accurately reflected.

In FIG. 5, the operation circuit (the difference circuit) 530 that subtracts the output of the output signal error calculation circuit 520 is arranged at a stage subsequent to the low pass filter 107, but since the low frequency noise component is a low frequency region that passes through the low pass filter, there is no problem.

Second Embodiment

Figure 6:
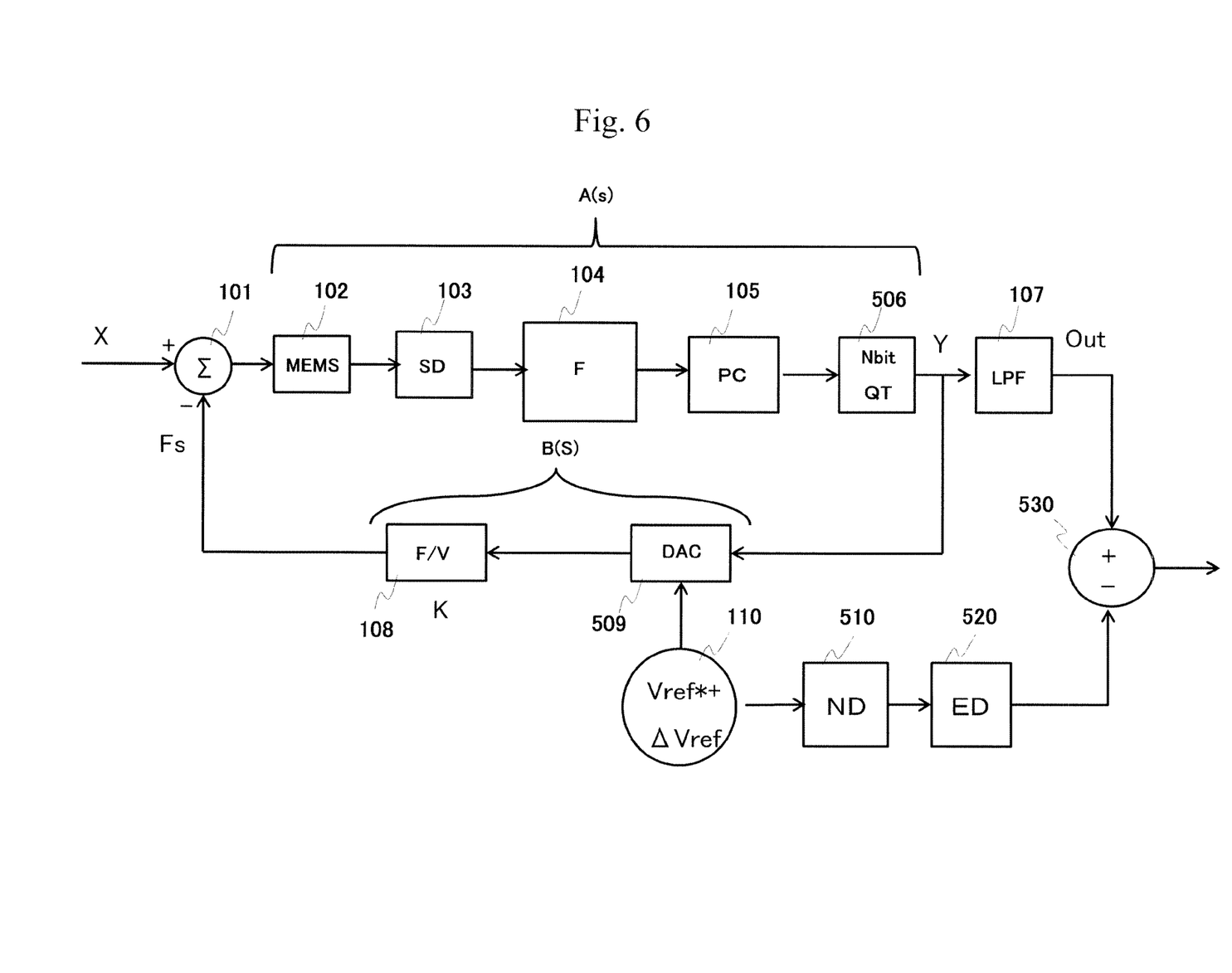
FIG. 6 is a block diagram for describing a second embodiment of the present invention.

FIG. 6 is a block diagram for describing another embodiment of the present invention. The same components to those in FIG. 5 are denoted by the same reference numerals. In this example, an n-bit quantizer 506 and an n-bit digital-to-analog conversion circuit 509 are used instead of the one-bit quantizer 106 and the one-bit digital-to-analog conversion circuit 109. In other words, in the present invention, a multi-bit quantizer and a multi-bit digital-to-analog converter (DAC) are also supported.

The example of FIG. 6 is similar to the first embodiment in that the low frequency voltage variation of the reference voltage power source is detected through another path, an error of an output caused by a voltage variation is calculated, and the error is cancelled from the output signal.

Third Embodiment

Figure 7:
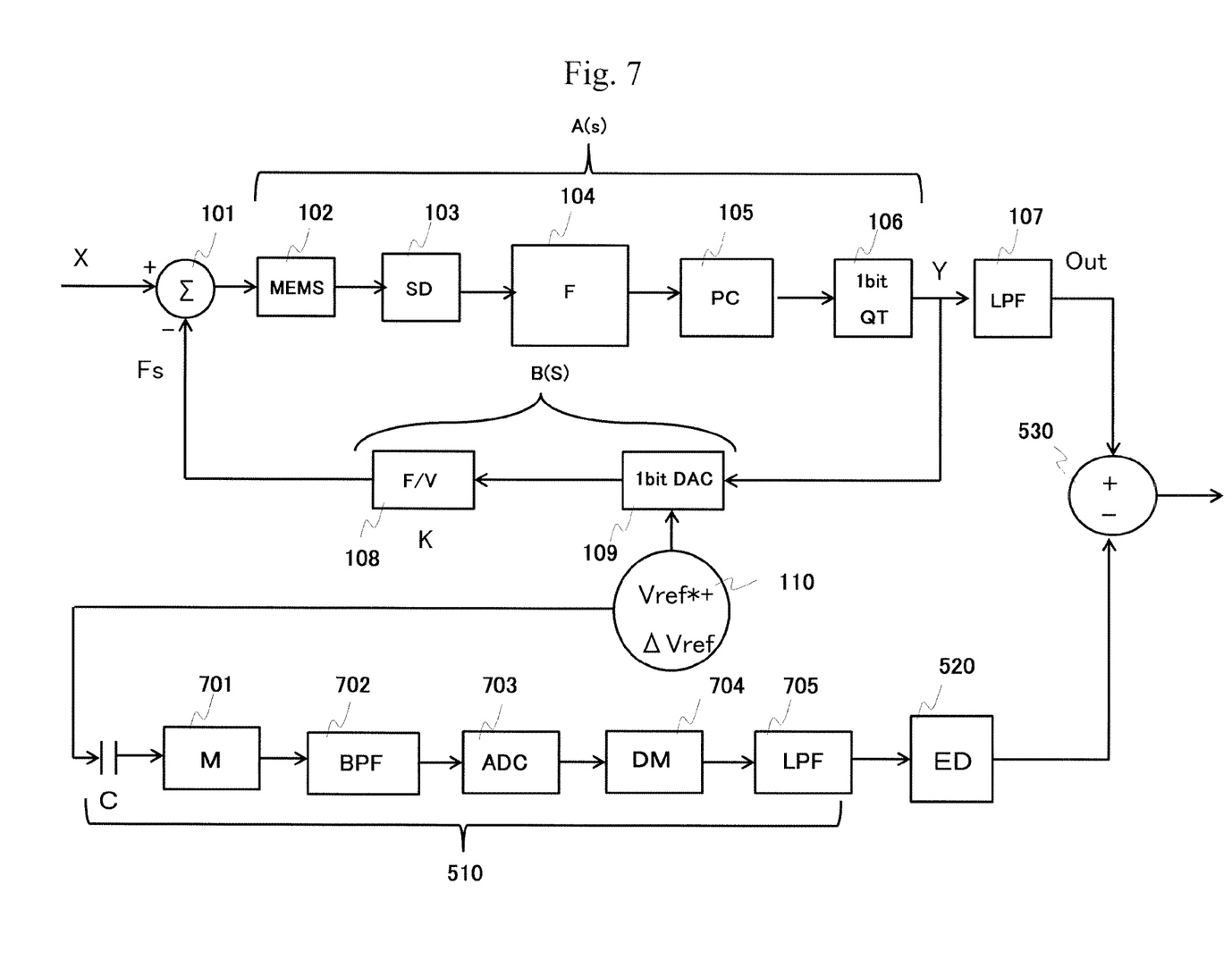
FIG. 7 is a block diagram for describing a third embodiment of the present invention.

FIG. 7 is a block diagram for describing an embodiment of the present invention. The same components to those in FIG. 5 are denoted by the same reference numerals. In this example, a specific example of a configuration of the reference power source variation detection circuit 510 is illustrated. A low frequency noise component of interest in the output of the servo-control voltage source 110 is extracted with a high degree of accuracy and input to the output signal error calculation circuit 520.

In the circuit of FIG. 7, the output of the servo-control voltage source 110 is input to a capacitor C, and an unnecessary high frequency component is cut. Generally, since a high frequency is more easily detected than a low frequency, an output of the capacitor C including the low frequency noise component is modulated to a high frequency through a modulator 701.

Since there are cases in which a detection circuit (for example, a pre-amplifier (not illustrated)) at a stage subsequent to the modulator 701 has the low frequency noise component, it is possible to separate the low frequency noise component from the low frequency noise component of the detection circuit system and detect it by modulating the low frequency noise component to the high frequency once. For example, it is possible to separate the low frequency noise component from the low frequency noise component included in the circuit by modulating a signal of several to several hundreds of hertz to a signal of several hundreds of hertz to several megahertz. Thereafter, the modulated signal is input to a band pass filter 702, and thus a frequency component of interest is extracted.

An output of the band pass filter 702 is converted into a digital signal through an analog-to-digital (A/D) converter 703 and demodulated to the original frequency (the low frequency) through a demodulator 704. The low frequency noise component of interest is extracted from the signal of the demodulator 704 through a low pass filter 705. The low pass filter 704 removes, for example, a switching noise or the like which is mixed in the high frequency in the A/D converter 703. An output of the low pass filter 704 is input to the output signal error calculation circuit 520, and the error component of the output signal Y is calculated.

Figure 8:
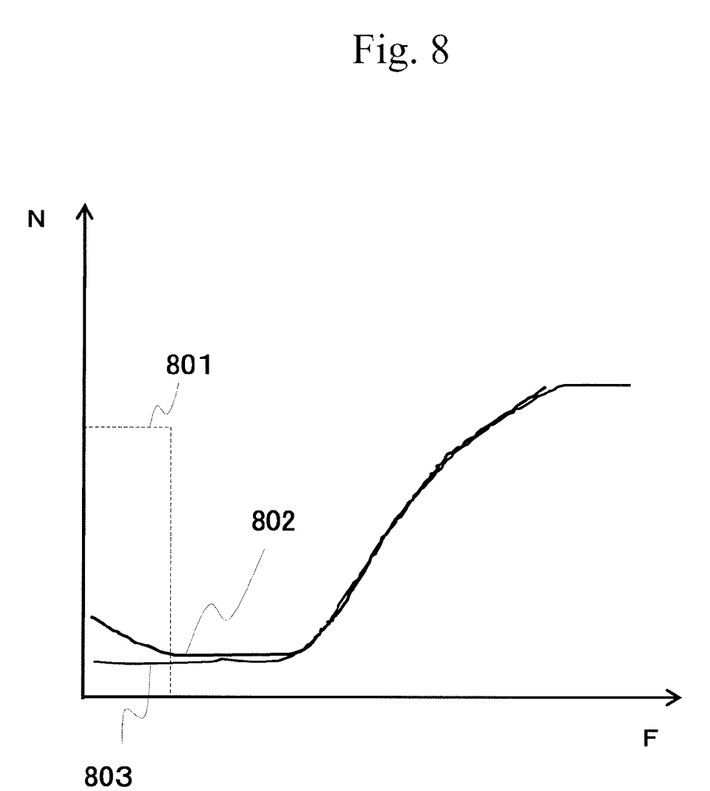
FIG. 8 is a graph illustrating a simulation result of the present embodiment.

FIG. 8 is a graph illustrating a simulation result, that is, a noise reduction effect according to the third embodiment of the present invention. A horizontal axis indicates a frequency region, and a vertical axis indicates a noise level.

A region indicated by a rectangle 801 is a valid signal region (for example, 1 to 500 Hz) which is useful for the resource exploration or the like. In a characteristic 802 which is not used in the present embodiment, the detection signal noise caused by the reference power source voltage variation is shown in the valid signal region. A detection signal noise reduction effect can be confirmed as indicated by 803 indicating a characteristic which is used in the present embodiment.

As described above, in the above embodiments, it is possible to reduce noise in the detection circuit for use in the ultrahigh-sensitivity MEMS sensor system. Accordingly, it is possible to prevent a reduction in detection accuracy which is caused by the servo-control reference voltage noise. Further, it is possible to implement such an effect without employing an expensive servo voltage power source circuit.

The present invention is not limited to the above embodiments and includes various modified examples. For example, a part of a configuration of a certain embodiment may be replaced with a configuration of another embodiment, and a configuration of a certain embodiment may be added to a configuration of another embodiment. Further, addition, deletion, or replacement of a configuration of a certain embodiment can be performed on a part of a configuration of each embodiment.

The present invention can be applied to various high-accuracy vibration detection sensors.

REFERENCE SIGNS LIST

101 adder
102 MEMS
103 signal detection circuit
104 noise shaping filter
105 phase corrector
106 1-bit quantization circuit
107 low pass filter
108 conversion circuit
109 1-bit D/A converter
110 servo-control voltage source
510 reference power source variation detection circuit
520 output signal error calculation circuit
530 operation circuit

The invention claimed is:

1. A high-sensitivity sensor system, comprising:
   an acceleration sensor;
   a detection circuit that detects an output of the acceleration sensor;
   a feedback circuit including a reference voltage power source that generates a feedback signal to be fed back to the acceleration sensor based on an output of the detection circuit system; and
   a correction circuit comprising
      a reference power source variation detection circuit that detects a voltage variation component with respect to a reference voltage of the reference voltage power source,
      an output signal error calculation circuit that receives an output of the reference power source variation detection circuit as an input, and calculates a change in the voltage variation component up to the output of detection circuit via the acceleration sensor, and
      an operation circuit that subtracts an output of the output signal error calculation circuit from the output of the detection circuit.

2. The high-sensitivity sensor system according to claim 1,
   wherein the detection circuit comprises:
   a signal detection circuit that converts an output of a micro electro mechanical systems (MEMS) serving as an acceleration sensor into a voltage signal,
   a noise shaping filter that receives the output of the signal detection circuit as an input,
   a phase corrector that corrects a phase of an output of the noise shaping filter, and
   a quantization circuit that quantizes an output of the phase corrector.

3. The high-sensitivity sensor system according to claim 1,
   wherein the feedback circuit comprises:
   a digital-to-analog (D/A) converter that receives the reference voltage from the reference voltage power source as an input, and
   a conversion circuit that uses an output of the D/A converter as an input to the acceleration sensor.

4. The high-sensitivity sensor system according to claim 1,
   wherein the correction circuit comprises:
   as the reference power source variation detection circuit,
   a capacitive element that receives an output of the reference voltage power source as an input,
   a modulator that receives an output of the capacitive element as an input,
   a band pass filter that receives an output of the modulator as an input,
   an analog-to-digital (A/D) converter that receives an output of the band pass filter as an input,
   a demodulator that receives an output of the A/D converter as an input, and
   a low pass filter that receives an output of the demodulator as an input.

5. The high-sensitivity sensor system according to claim 1, further comprising,
an output side low pass filter that extracts a frequency band of 1 kHz or less from the output of the detection circuit.

6. A high-sensitivity detection circuit, comprising:
a detection circuit that detects a signal output from an acceleration sensor;
a feedback circuit including a reference voltage power source that generates a feedback signal to be fed back to the acceleration sensor based on an output of the detection circuit; and
a correction circuit comprising
a reference power source variation detection circuit that detects a voltage variation component with respect to a reference voltage of the reference voltage power source,
an output signal error calculation circuit that receives an output of the reference power source variation detection circuit as an input, and calculates a change in the voltage variation component up to the output of detection circuit via the acceleration sensor, and
an operation circuit that subtracts an output of the output signal error calculation circuit from the output of the detection circuit.

7. The high-sensitivity detection circuit according to claim 6,
wherein the detection circuit includes
a signal detection circuit that converts an output of a micro electro mechanical systems (MEMS) serving as an acceleration sensor into a voltage signal,
a noise shaping filter that receives the output of the signal detection circuit as an input,
a phase corrector that corrects a phase of an output of the noise shaping filter, and
a quantization circuit that quantizes an output of the phase corrector.

8. The high-sensitivity detection circuit according to claim 6,
wherein the feedback circuit comprises:
a digital-to-analog (D/A) converter that receives the reference voltage from the reference voltage power source as an input, and
a conversion circuit that uses an output of the D/A converter as an input to the acceleration sensor.

9. The high-sensitivity detection circuit according to claim 6,
wherein the correction circuit comprises:
as the reference power source variation detection circuit,
a capacitive element that receives an output of the reference voltage power source as an input,
a modulator that receives an output of the capacitive element as an input,
a band pass filter that receives an output of the modulator as an input,
an analog-to-digital (A/D) converter that receives an output of the band pass filter as an input,
a demodulator that receives an output of the A/D converter as an input, and
a low pass filter that receives an output of the demodulator as an input.

10. The high-sensitivity detection circuit according to claim 6, further comprising,
an output side low pass filter that extracts a frequency band of 1 kHz or less from the output of the detection circuit.

11. A high-sensitivity detection method, comprising:
electrically detecting an output of an acceleration sensor;
generating a feedback signal to be fed back to the acceleration sensor based on a detection signal detected in the electrically detecting step, using a reference voltage; and
performing a correction process including
using a reference power source variation detection process, detecting a voltage variation component with respect to the reference voltage,
performing an output signal error calculation process of calculating a change which the voltage variation component applies to the detection signal, and
subtracting the change from the detection signal detected in the detection process.

12. The high-sensitivity detection method according to claim 11,
wherein the electrically detecting further comprises:
using a signal detection circuit, converting an output of a micro electro mechanical systems (MEMS) serving as an acceleration sensor into a voltage signal,
receiving an output of the signal detection circuit by a noise shaping filter,
correcting a phase of an output of the noise shaping filter, and
quantizing an output of the phase corrector are used.

13. The high-sensitivity detection method according to claim 11,
wherein said step of generating a feedback signal comprises:
receiving the reference voltage at a digital-to-analog (D/A) converter, and
receiving an output of the D/A converter as an input to the acceleration sensor via a conversion circuit.

14. The high-sensitivity detection method according to claim 11,
wherein the correction process; comprises:
receiving the reference voltage by a capacitive element,
receiving an output of the capacitive element by a modulator,
receiving an output of the modulator by a band pass filter,
receiving an output of the band pass filter by an analog-to-digital (A/D) converter,
receiving an output of the A/D converter by a demodulator, and
receiving an output of the demodulator by a low pass filter.

15. The high-sensitivity detection method according to claim 11,
extracting a frequency band of 1 kHz or less from the output of the electrically detecting using an output side low pass filter.

16. The high-sensitivity detection method according to claim 11, further comprising:
performing underground resource exploration using a plurality of said high-sensitivity sensor systems,
wherein each said high-Sensitivity, sensor system comprises
an acceleration sensor;
a detection circuit that detects an output of the acceleration sensor;
a feedback circuit including a reference voltage power source that generates a feedback signal to be fed back to the acceleration sensor based on an output of the detection circuit system; and a correction circuit comprising
 a reference power source variation detection circuit that detects a voltage variation component with respect to a reference voltage of the reference voltage power source,
 an output signal error calculation circuit that receives an output of the reference power source variation detection circuit as an input, and calculates a change in the voltage variation component up to the output of detection circuit via the acceleration sensor, and
an operation circuit that subtracts an output of the output signal error calculation circuit from the output of the detection circuit.

* * * * *